(12) United States Patent
Pederson

(10) Patent No.: US 11,102,974 B2
(45) Date of Patent: Aug. 31, 2021

(54) POP-UP FOLDABLE HUNTING BLIND

(71) Applicant: Scott Pederson, Centuria, WI (US)

(72) Inventor: Scott Pederson, Centuria, WI (US)

(*) Notice: Subject to any disclaimer, the term of this patent is extended or adjusted under 35 U.S.C. 154(b) by 0 days.

(21) Appl. No.: 16/994,067

(22) Filed: Aug. 14, 2020

(65) Prior Publication Data
US 2021/0227821 A1 Jul. 29, 2021

Related U.S. Application Data

(60) Provisional application No. 62/966,690, filed on Jan. 28, 2020.

(51) Int. Cl.
| | | |
|---|---|---|
| *A01M 31/02* | (2006.01) | |
| *E04H 15/48* | (2006.01) | |
| *E04H 15/40* | (2006.01) | |
| *E04H 15/00* | (2006.01) | |
| *E04H 15/56* | (2006.01) | |
| *E04H 15/58* | (2006.01) | |

(52) U.S. Cl.
CPC ......... *A01M 31/025* (2013.01); *E04H 15/001* (2013.01); *E04H 15/405* (2013.01); *E04H 15/48* (2013.01); *E04H 15/56* (2013.01); *E04H 15/58* (2013.01)

(58) Field of Classification Search
CPC ..... E04H 15/001; E04H 15/40; E04H 15/405; E04H 15/44; E04H 15/52; A01M 31/025
See application file for complete search history.

(56) References Cited

U.S. PATENT DOCUMENTS

| | | | | |
|---|---|---|---|---|
| 3,810,482 A | * | 5/1974 | Beavers | E04H 15/48 135/147 |
| 3,913,598 A | * | 10/1975 | Glutting, Jr. | E04H 15/48 135/152 |
| 4,554,937 A | * | 11/1985 | Irwin | E04H 15/001 135/100 |
| 4,632,138 A | * | 12/1986 | Irwin | E04H 15/001 135/143 |
| 4,819,680 A | * | 4/1989 | Beavers | E04H 15/32 135/119 |
| 5,573,028 A | * | 11/1996 | van der Stigohel | E04H 15/48 135/147 |
| 5,592,961 A | * | 1/1997 | Chin | E04H 1/1244 135/125 |
| 5,762,085 A | | 6/1998 | Punch | |
| 6,434,877 B1 | * | 8/2002 | Shelton | A01M 31/025 135/90 |
| 7,182,091 B2 | * | 2/2007 | Maddox | A01M 31/025 135/90 |
| 7,246,630 B1 | * | 7/2007 | Ransom | A01M 31/025 135/117 |
| 7,296,658 B1 | | 11/2007 | Pederson | |
| 7,690,481 B1 | | 4/2010 | Pederson | |

(Continued)

*Primary Examiner* — David R Dunn
*Assistant Examiner* — Danielle Jackson
(74) *Attorney, Agent, or Firm* — Thomas J. Nikolai; DeWitt LLP

(57) ABSTRACT

A hunting blind including three framed sidewalls and a panel permits the shape of the hunting blind to be adapted for secure positioning on various platforms of tree stands or the ground. The three framed sidewalls and panel have openings that can be fully or partially closed for comfort and visibility of a hunter or photographer located in the blind.

20 Claims, 11 Drawing Sheets

(56) References Cited

U.S. PATENT DOCUMENTS

| | | | |
|---|---|---|---|
| 7,743,781 B2* | 6/2010 | Slaughter | A01M 31/025 135/117 |
| 7,775,230 B2* | 8/2010 | Lau | E04H 15/001 135/126 |
| 7,958,904 B2* | 6/2011 | Lau | A01M 31/025 135/147 |
| 8,342,197 B2* | 1/2013 | Roman | E04H 15/30 135/125 |
| 9,447,602 B1* | 9/2016 | Arias | E04H 15/58 |
| 9,512,632 B2* | 12/2016 | Cook | E04H 15/02 |
| 2008/0083443 A1* | 4/2008 | Eastman, II | E04H 15/44 135/121 |
| 2009/0084420 A1* | 4/2009 | Pelsue | E04H 15/48 135/96 |
| 2011/0168221 A1* | 7/2011 | Schlipf | E04H 15/48 135/143 |
| 2013/0306121 A1* | 11/2013 | Hung Lau | A01M 31/025 135/117 |
| 2018/0064097 A1* | 3/2018 | Nolz | A01M 31/025 |
| 2018/0066446 A1* | 3/2018 | Nolz | E04H 15/48 |
| 2018/0291644 A1* | 10/2018 | Pescovitz | E04H 15/54 |
| 2019/0226228 A1* | 7/2019 | Pescovitz | E04H 15/54 |
| 2020/0131797 A1* | 4/2020 | Pescovitz | E04H 15/405 |

* cited by examiner

POP-UP FOLDABLE HUNTING BLIND

This is a non-provisional application claiming priority to provisional application Ser. No. 62/966,690, filed Jan. 28, 2020.

BACKGROUND OF THE INVENTION

Field of the Invention

The present invention relates to a pop-up, foldable hunting blind and, more specifically, a hunting blind that is adapted to be selectively positioned on the ground or on the platform of a hunting tree stand.

Description of the Prior Art

Portable hunting blinds are well known in the prior art. For example, U.S. Pat. No. 5,762,085, granted on Jun. 9, 1998 to Timmy J. Punch, discloses such a hunting blind and references in the Background of the Invention section several other patents disclosing such hunting blinds.

Like the hunting blind shown in the Punch patent, known portable collapsible hunting blinds typically have a fixed rectangular shape. As such, they all suffer from two significant problems. First, a hunter sitting in a blind and protected by the blind from inclement weather has a limited field of view. Visual blind spots exist in areas surrounding and encompassing each of the four corners where the adjacent walls to the rectangular blind are joined. These areas, likewise, are large enough to also impede the hunter from being able to aim a weapon or camera in an effective manner.

Second, known ground blinds are not adapted to be positioned on a platform of a tree stand. The rectangular base of a rectangular-shaped blind is often wider than the platform of a single person tree stand. As such, the tree stand cannot support the blind. There is also no attachment mechanism provided to fasten the blind to the tree stand. Were any of the known ground blinds to be positioned on the platform of a tree stand, both ingress and egress of a hunter with respect to the interior of such a blind would be difficult and dangerous. For these and other reasons, ground blinds do not have any mechanism which allows the blind to be securely mounted to the platform of a tree stand.

SUMMARY OF THE INVENTION

To overcome the deficiencies in prior art blinds described above, the present invention provides an improved folding hunting blind adapted to be collapsed for transportation and storage and having a deployed state which allows the base of the blind to sit on and be securely attached to a platform of a tree stand. Some embodiments of the present invention, when viewed from the top or bottom, have a triangular or trapezoidal shape. This shape is provided by three framed sidewalls and a frameless side panel. A flexible fabric living hinge is used to join adjacent framed sidewalls together.

The three framed sidewalls each comprise a collapsible frame. Such a frame may have a resilient construction that allows the frame to collapse without being disassembled. Alternatively, the frame may comprise a plurality of components adapted to be assembled and disassembled. In some embodiments, the frame of each of these framed sidewalls has an oval shape. These framed sidewalls further comprise a multi-part fabric structure filling the center of the frame. More specifically, the multi-part fabric structure includes an outer section in the form of a ring and an inner section coupled to the outer section. Zippers, hook and loop fasteners, a plurality of magnets, or other suitable mechanisms may be used to secure the inner section to the outer section to close the center of the ring. The inner section may also comprise one or more windows and associated flaps adapted to cover these windows when desired. The flap can be held in the closed position by zippers, hook and loop fasteners, magnets, or the like.

The frameless side panel is made entirely of fabric with a vertical slit extending at its center from the top to the bottom of the panel. This slit may be temporarily held closed using zippers, hook and loop fasteners, a plurality of magnets, or other suitable mechanism. When it is desirable for the overall configuration to have a generally triangular shape, this panel is collapsed between the two adjacent framed sidewalls. Alternatively, if a trapezoidal shape is desired, the two adjacent framed sidewalls are pushed apart and a brace can be extended across the top between the two adjacent framed sidewalls such that the frameless panel has a rectangular shape and the overall configuration of the blind is trapezoidal. When one desires to collapse the blind for transport or storage, this brace is removed (or at least disengaged) from the two adjacent framed sidewalls. Each of the three framed sidewalls and the frameless panel are collapsed relative to each other.

The blind further includes a roof made of fabric that is adapted to be stretched between the three framed sidewalls and the frameless panel. Depending from the three framed sidewalls and the panel is a skirt.

The configuration described above permits ingress and egress through any of the three framed sidewalls or the panel. The flexibility of the panel and the living hinges permits the overall configuration to be adjusted so that the blind may be fully supported on the platform of a tree stand. Additionally, and particularly when the blind is in its triangular configuration, a hunter or photographer is able to selectively open the inner sections and/or flaps of the three framed sidewalls and the slit of the frameless panel based on weather conditions and visibility considerations.

The fabric used in creation of the walls, the panel, the roof, and the skirt top will typically have a color and pattern designed to camouflage the blind. Further, the fabric is made of a water impermeable/repellant material so the user can sit in the blind even on the rainiest of days without getting wet. The skirt of the blind can be provided with attachment members that allow the blind to be coupled to the platform of a tree stand. Zippers, hook and loop fasteners, a plurality of magnets, or other suitable attachment mechanisms may be used to couple the blind to the tree stand's platform.

BRIEF DESCRIPTION OF THE DRAWINGS

The objects and advantages of the present invention will be better understood when consideration is given to the detailed description provided below when read in conjunction with the drawings.

DETAILED DESCRIPTION

Figure 1:
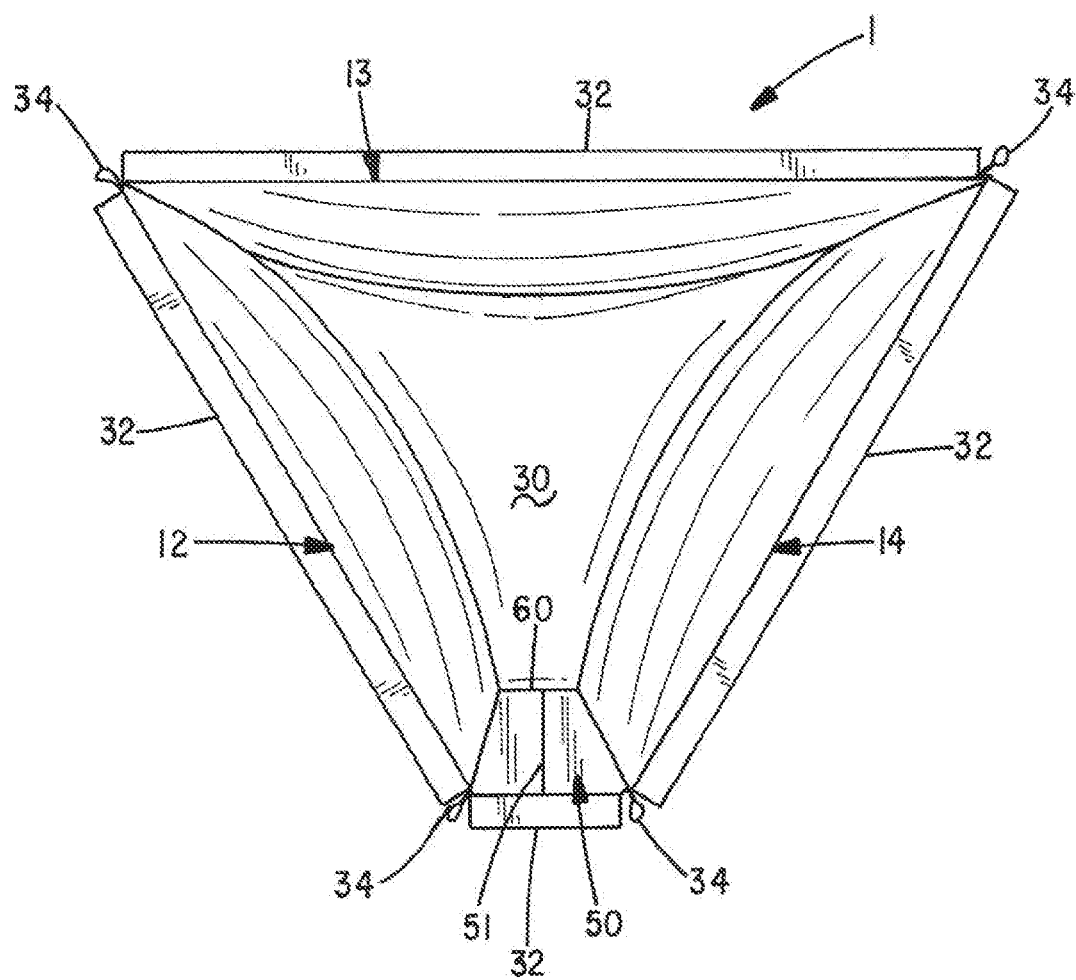
FIG. 1 is a top view of one embodiment of a blind made in accordance with the present invention showing the overall triangular/trapezoidal shape of the blind when deployed.
Figure 2:
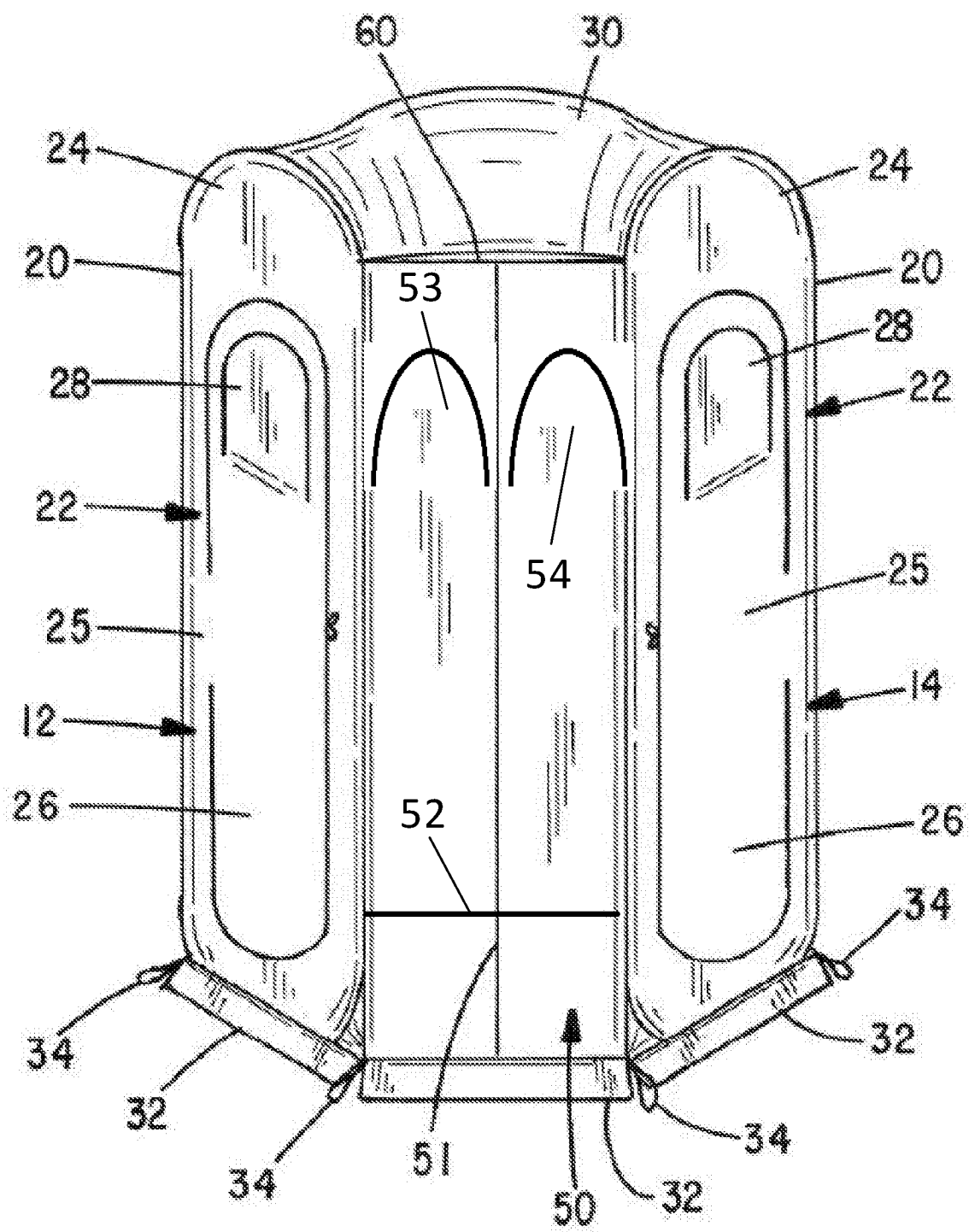
FIG. 2 is a back view of the blind of FIG. 1.
Figure 4:
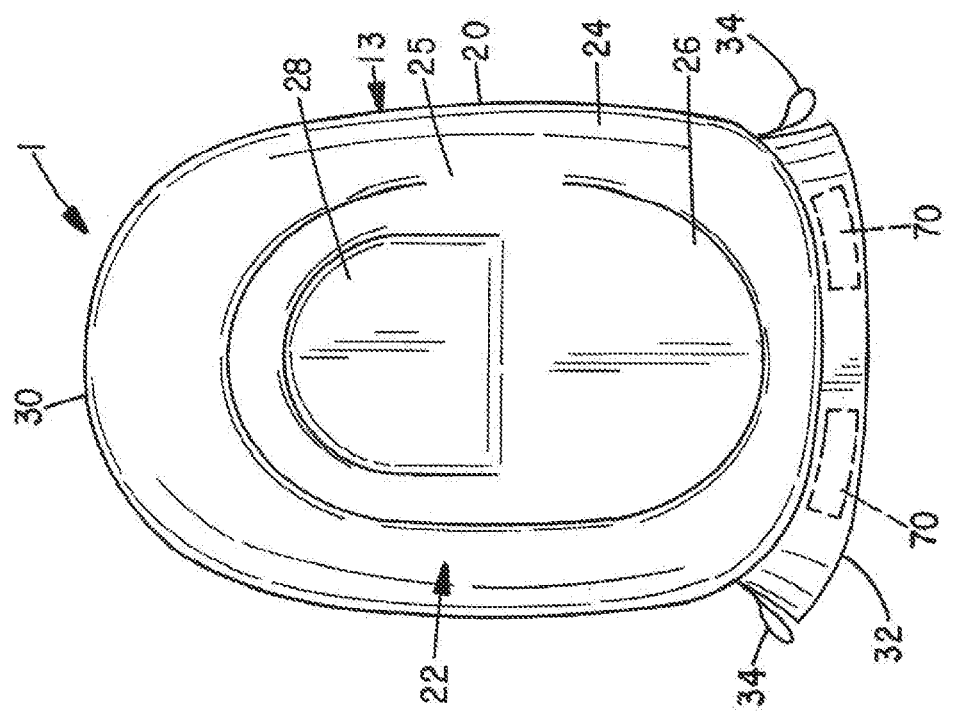
FIG. 4 is a front view of the blind of FIG. 1.
Figure 3:
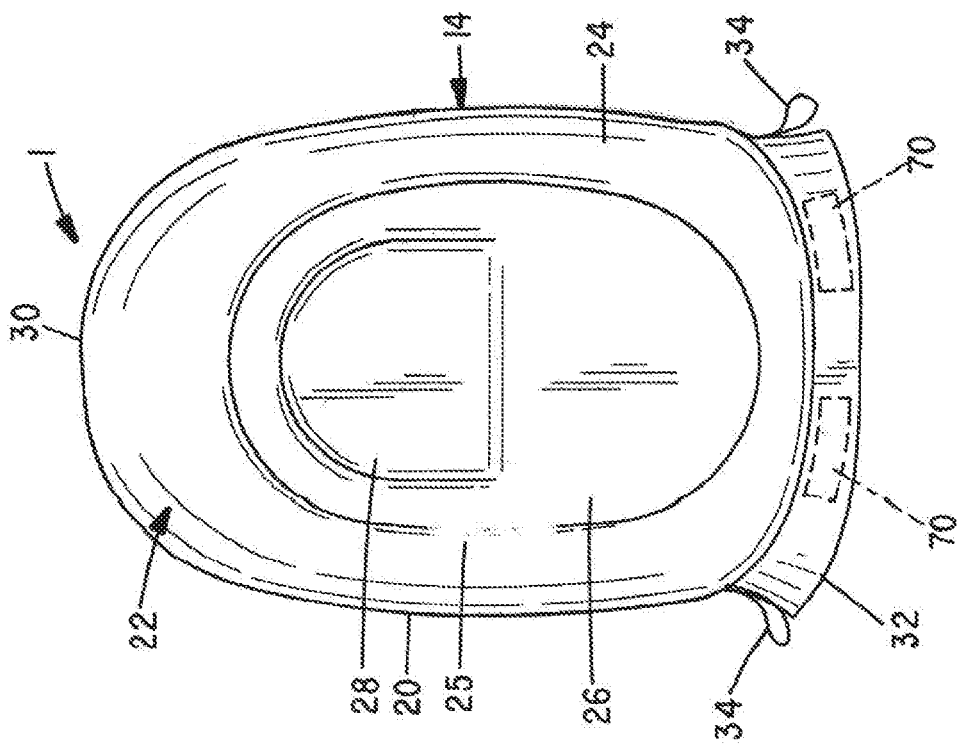
FIG. 3 is a right-side view of the blind of FIG. 1.

Collapsible, portable blinds known in the prior art and typically used by photographers and hunters suffer from at least two significant deficiencies. First, they are not adapted to be positioned on the platform of a tree stand. As such, they cannot be elevated off the ground and used to conceal a photographer or hunter who wishes to shoot from an elevated vantage point. Second, prior art collapsible and portable blinds typically are rectangular in shape and have large areas at each of the four corners that obscure the view of the photographer or hunter. The blind 1 shown in the drawings overcomes these two significant problems and others inherent in the design of prior art blinds.

When deployed and viewed from either the top or bottom, the blind 1 has a generally triangular shape comprising a first framed sidewall 12, a second framed sidewall 13 and a third framed sidewall 14. See FIG. 1. Each framed sidewall has an oval shaped frame member 20. The oval shaped frame members 20 are preferably constructed of a resilient material that will allow the frame members 20 to hold their oval shape when the blind is deployed, yet flexible enough to permit the blind 1 to be folded for transportation and storage. In some embodiments, the frame members 20 each comprise a single element such as a metal or fiberglass band or rod formed to provide the oval shape. In other embodiments, each frame 20 comprises a plurality of frame elements having ends adapted to be mated together to form the oval shape. By way of example, the frame can include top and bottom members, a pair of side members, connectors uses to attach the top member to top ends of the two side members, and connectors used to attach the bottom member to bottom ends of the two side members.

Figure 6:
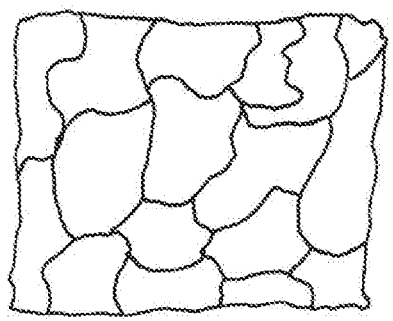
FIG. 6 is a representative example of a fabric pattern that may be employed to camouflage the blind of FIG. 1.

Each of framed sidewalls 12, 13 and 14 further comprise a multi-part fabric structure 22. Fabric structure 22 is coupled to the frame members 20 of the framed sidewall and fills the center of the oval defined by the frame members 20. Each multi-part fabric structure 22 shown in the drawings comprises an outer section 24, an inner section 26, and a flap 28. The multi-part fabric structure 22 is formed from a single piece of water repellant, mildew resistant fabric. The color or pattern of the fabric is designed to blend in with the surrounding foliage where the blind 1 is intended to be used to conceal the blind 1 from animals in the vicinity of the deployed blind. An example of such a pattern is shown in FIG. 6.

Figure 7:
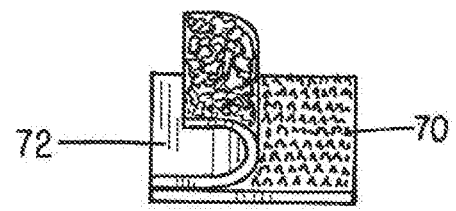
FIG. 7 is a perspective view of a hook and loop type fastener that may be employed in constructing the blind of FIG. 1.

The outer section 24 of each multi-part fabric structure 22 has an oval shape with a center opening. The outer periphery of the outer section 24 is adapted to be joined to the frame 20. Joining the outer section 24 to the frame 20 may be achieved in various ways. For example, the outer section 24 may have a pocket formed about its outer periphery encapsulating the frame 20. Alternatively, strips of hook and loop type fasteners of the type sold under the VELCRO® trademark may be used to couple the outer section 24 to the frame 20. Such a hook and loop type fastener is shown in FIG. 7. Such fasteners include a first strip of hooks 70 and a second strip of loops 72. One of these strips is adhesively bonded to the frame and the other of these strips is either adhesively bonded or sewn to the fabric of the outer section 24. When the two strips are brought together, the hooks and loops intertwine to form a bond. In still other embodiments, straps, ties, snaps, magnets, buttons, or adhesives may be used to couple the outer section 24 to the frame 20.

The outer section 24 of each multi-part fabric structure 22 has a large central opening adapted to be filled by the inner section 26 of the multi-part structure 22 which is also oval shaped. The inner section 26 and the outer section 24 are formed of a single piece of fabric and a small section 25 of this fabric is left intact to act as a living hinge and permanently coupling the inner section 26 and the outer section 24 together. The inner section 26 acts as a fabric door that can be opened and closed as desired relative to the large central opening of the outer section. The portion of the fabric between the outer section and the inner section left intact acts as a hinge.

One or more closure members are deployed around the remainder of the inner section 26 that allows the inner section 26 to be held closed relative to the outer section when desired or released and drawn open. Such closure members may comprise additional strips of hook and loop material as shown in FIG. 7, a series of snaps like the snap shown in FIG. 8, a series of magnetic fasteners like the magnetic fastener shown in FIG. 9, one or more zippers like the zipper shown in FIG. 11, or a series of button fasteners like the button fastener shown in FIG. 10. The shape of the buttons may be modified to make it easier to manipulate them while wearing gloves or mittens. For example, dog-bone shaped buttons may be used. Alternative fasteners may be employed without deviating from the invention.

Figure 8:
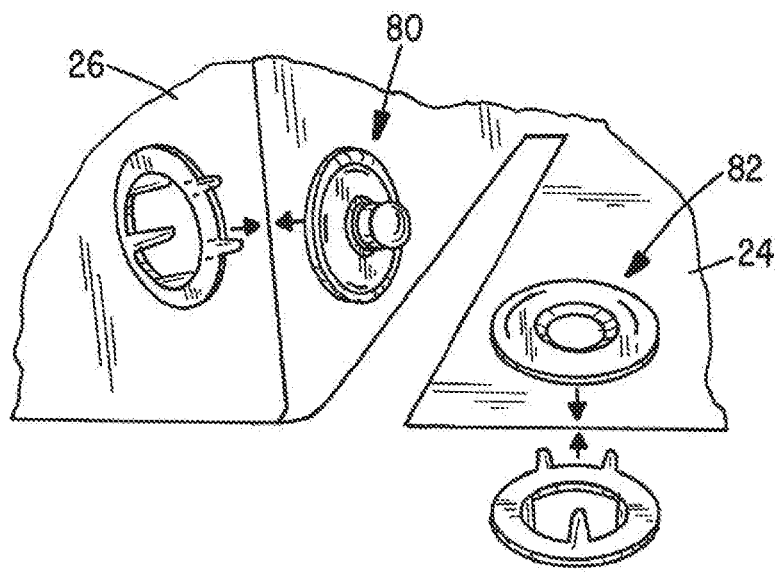
FIG. 8 is a perspective view of a snap-type fastener that may be employed in the construction of the blind of FIG. 1.

The snap shown in FIG. 8 comprises a male snap member 80 coupled to the outer section 26 and a female snap member 82 coupled to the outer section 24. The male snap member may be temporarily mated to the female snap member to close the outer section 24 with the inner section 26. Use of a plurality of spaced-apart snaps about the opening allows different portions of the opening to be selectively opened and closed by portions of the inner section 26.

Figure 9:
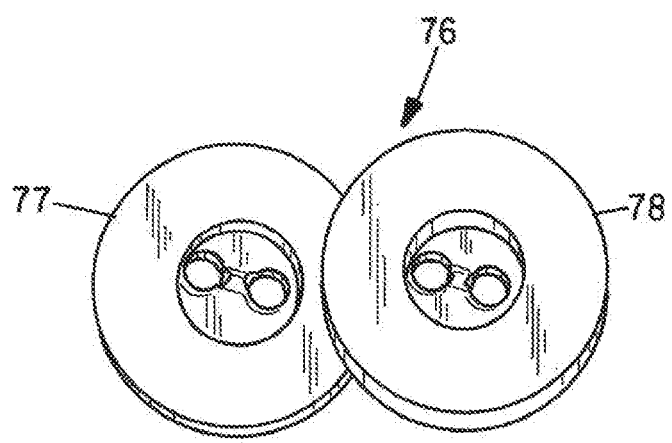
FIG. 9 is a perspective view of a magnetic fastener that may be employed in the construction of the blind of FIG. 1.

A plurality of magnetic fasteners 76 may be sewn into the fabric of either the inner section 26 or outer section 24, as illustrated in FIG. 9. More specifically, the magnetic fasteners 76 each include a magnet 77 sewn into the fabric at predetermined spaced intervals near the outer periphery of the inner section 26 or the inner edge of the outer section 24. The magnetic fasteners 76 also include additional magnets, or pieces of ferro-magnetic material 78 similarly sewn into the fabric of the other of the outer periphery of the inner section 26 or the inner edge of the outer section 24 at matching predetermined intervals so that the magnetic force supplied by the magnets may be used to temporarily secure the inner section 26 to the outer section in the closed portion. When magnets are sewn into both inner section 26 and the outer section 24, the poles of the magnet pairs must be properly aligned so the magnets are attached to each other rather than repel each other.

Figure 10:
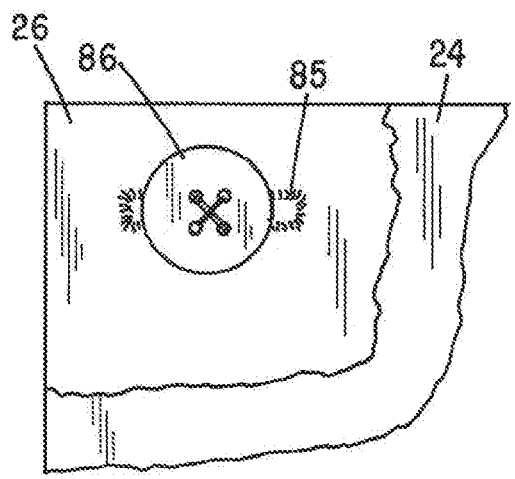
FIG. 10 is a plan view of a button fastener that may be employed in the construction of the blind of FIG. 1.

A plurality of buttons may be sewn to the fabric of either the inner section 26 or outer section 24 at predetermined spaced intervals near the outer periphery of the inner section 26 or the inner edge of the outer section 24. As illustrated in FIG. 10, a button 86 is attached to the outer section 24 and is adapted to mate with a corresponding buttonhole 85 formed in the inner section 26. Buttons can be selectively employed to open, close, or partially close the opening in outer section 24 with the inner section 26.

Figure 11:
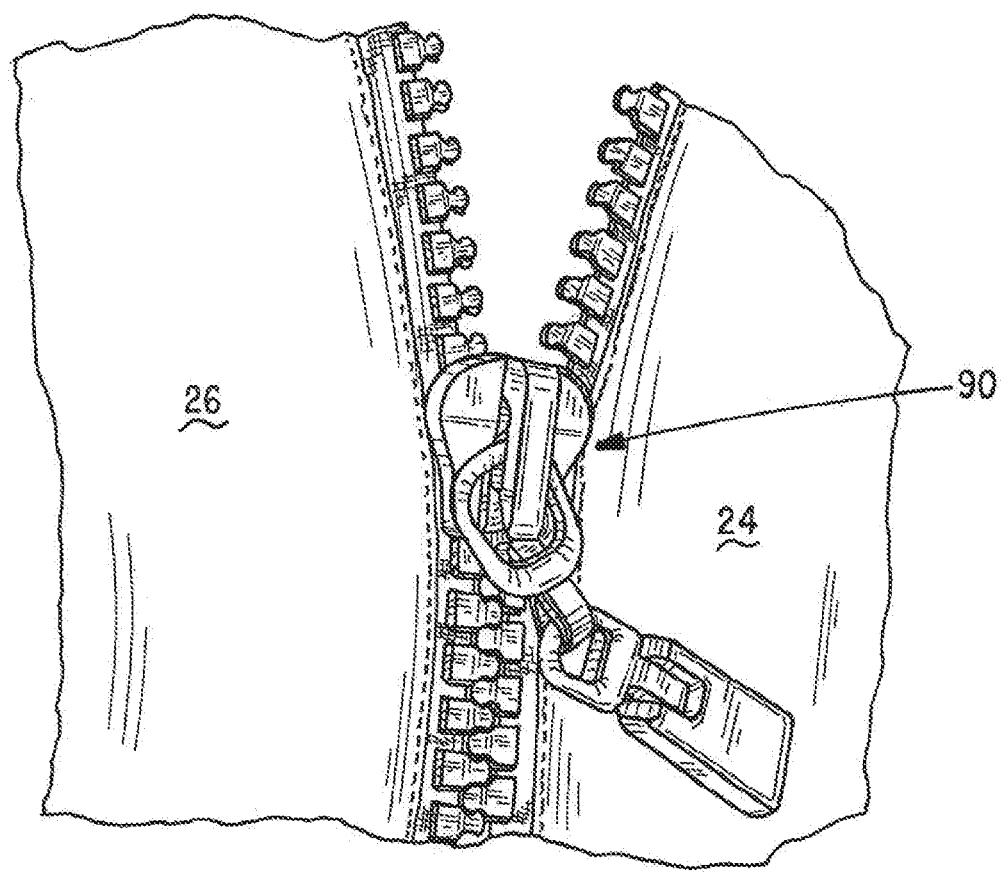
FIG. 11 is a plan view of a zipper that may be employed in the construction of the blind of FIG. 1.

FIG. 11 shows a zipper 90 used to temporarily join the free portion of inner section 26 to the outer section 24. Like the hook and loop, magnetic, snap and button fasteners discussed above, the zipper 90 may be selectively deployed to fully open, fully close or partially close the opening through the outer section 24 with the inner section 26.

No matter what means is used to temporarily hold the inner section 26 closed relative to the outer section 24, the means preferable will permit the inner section to be held fully closed, selectively partially closed, or entirely open. This way, the user of the blind 1 can selectively determine how much of the inner section 26 to leave open to enhance the user's ability to view the surrounding environment and how much to leave closed to protect the user from wind, rain, snow or the like. The goal of the design and the selection of such means is to allow the user to independently deploy the inner sections 26 relative to the outer section 24 of each of framed sidewalls 12, 13 and 14 as the user sees fit, taking comfort and the ability to view the surrounding area into account.

As suggested by the drawings, the inner section 26 of each of framed sidewalls 12, 13 and 14 is provided with a window which may be opened and closed by flap 28. The flap 28 is formed of the same piece of material as the inner section 26 and the outer section 24. The bottom of the flap 28 is left intact and acts as a hinge. Some means is deployed around the remainder of the flap 28 that allows the flap to be held closed (or partially closed), when desired. This means may be one or more zippers (see FIG. 11), magnetic fasteners (see FIG. 9), hook and loop arrangements (see FIG. 7), buttons (see FIG. 10), snaps (see FIG. 8), or the like, as described above.

The blind 1 has various other advantageous features. These include a fabric roof 30 coupled to each of the three framed sidewalls 12, 13 and 14 and adapted to protect the user from precipitation in the form of snow, sleet, hail and rain. The roof 30 also provides additional shade on sunny days. The fabric may be the same fabric as that used to form the multi-part fabric structures 22 of the three walls 12, 13 and 14 and is preferably a water repellant fabric. The roof fills in the gaps between the top portions of the three oval frames 20.

Another additional feature is a skirt 32 depending from each of the three framed sidewalls also preferably made from water repellant fabric. Skirt 32 fills in the gaps between the bottom portions of the three oval frames 20. When the blind 1 is positioned on the ground, rocks, logs, brush, or the like may be placed on the skirt to hold the blind in place. However, the skirt 32 also comprises securing members that may be employed to secure the blind 1 to the ground or the platform of a tree sand or some other similar structure. Such securing members may be looped straps 34 adapted to surround a stake (not shown). The blind 1 can also be fixed in position on the ground by pounding such a stake extending through the looped straps 34 into the ground.

When the blind 1 is positioned on a platform of a tree stand, the looped straps 34 may be employed to couple the blind to the tree stand's platform. For example, the looped straps 34 may be coupled to hooks on the platform or may be used in combination with bungee cords or the like to temporarily secure the blind to the tree stand. Alternatively, or in addition, the securing members of the skirt 32 may include hook strips 70 of hook and loop type fasteners coupled to the fabric of the skirt 32 using an adhesive or stitching. If the platform of the tree stand is carpeted, such as with indoor/outdoor carpeting, the hooks will engage the carpeting to temporarily fix the blind 1 in place on the platform. If the platform is not carpeted, strips of loops 72 may be attached to the platform to form a traditional hook and loop attachment with the strips of hooks joined to the skirt 32. Of course, alternative securing members such as holes through the skirt surrounded by grommets may be used in combination with stakes to temporarily, yet securely, join the blind 1 to the ground or with hooks attached to the platform of a tree stand to temporarily, yet securely, join the blind 1 to the platform.

The platforms of commercially available tree stands vary widely in size and shape. Some are designed for use by a single hunter or photographer, while others can accommodate more than one hunter or photographer at the same time. Also, they are typically mounted at a substantial height above the ground. Preexisting blinds having a fixed size and shape, such as a rectangularly-shaped blind, may have a base wider than the platform. Even when this is not the case, assembly at such heights would be difficult because multiple edges of a rectangular blind could easily be pushed past the corresponding edges of the platform causing the blind to fall. This risk is substantially reduced when the blind 1 is erected on top of the platform of a tree stand.

The blind 1 has an additional feature that makes both mounting the blind 1 on a tree stand platform and collapsing the blind 1 easier. More specifically, a living hinge which may be made of fabric is formed between framed sidewalls 12 and 13 and between framed sidewalls 13 and 14. Further, a flexible fabric frameless panel 50 is provided between and attached to framed sidewalls 12 and 14. The living hinges may be the same size and shape as the frameless panel 50, or they may be narrower. The frameless panel 50 has a vertical slit 51 extending its entire length. Zippers, hook and loop type fasteners, magnetic fasteners, buttons snaps (as shown in FIGS. 7-11) or the like can be used to hold the slit 51 closed when desired or permit the slit 51 to be opened, or partially opened when desired. The slit 51 may be used to access the interior of the blind 1. Panel 50 and aforementioned living hinges allows the adjacent ends of walls 12 and 14 to be moved relative to each other to adjust the size and shape of the bottom and top of the blind 1. More specifically, the panel 50 allows the shape to be adjusted so that the blind 1, when viewed from the top or the bottom, is triangular, trapezoidal, or even rectangular to accommodate platforms of tree stands of different sizes and shapes. The panel can also be used to expand the interior of the blind 1 as permitted by the dimensions of a tree stand platform or if the user otherwise so desired. The blind 1 may further comprise a member 60, such as a rod, adapted to temporarily extend between the walls 12 and 14 to retain the blind in a trapezoidal or rectangular shape. Member 60 may be removed to permit the blind 1 to return to the triangular shape. Removal of the member 60 and opening slit 51 makes it easier to fold the blind for transport and storage.

Near the bottom of frameless panel 50, a horizontal slit 52 may be provided. Slit 52 is provided when the blind is used on hang-on stands and ladder stands and allows the panel 50 to be easily fitted around to location where a hang-on tree stand is attached to a tree or were a ladder is attached to the platform of a ladder stand. One or more windows closed by flaps 53 and 54 may also be included in the panel 50. These windows open and close like the windows of the framed sidewalls 12, 13 and 14.

The blind 1, when in the triangular shape, has one fewer corner and offers wider angles of view than the rectangular blinds known in the prior art. A wider angle of view is also available when the shape of blind 1 is trapezoidal. The improved sight lines are beneficial to hunters, photographers, bird watchers, researchers and others who use blinds for work or pleasure.

As noted above, the fabric used is preferably a water repellant fabric. The fabric may also incorporate colors and/or patterns (see, e.g. FIG. 6) adapted to camouflage the blind permitting the blind to blend in with surrounding foliage. In other cases, bright colors (e.g., orange) may be used to enable other hunters, for example, to be able to distinguish the blind from the surrounding foliage.

Figure 5:
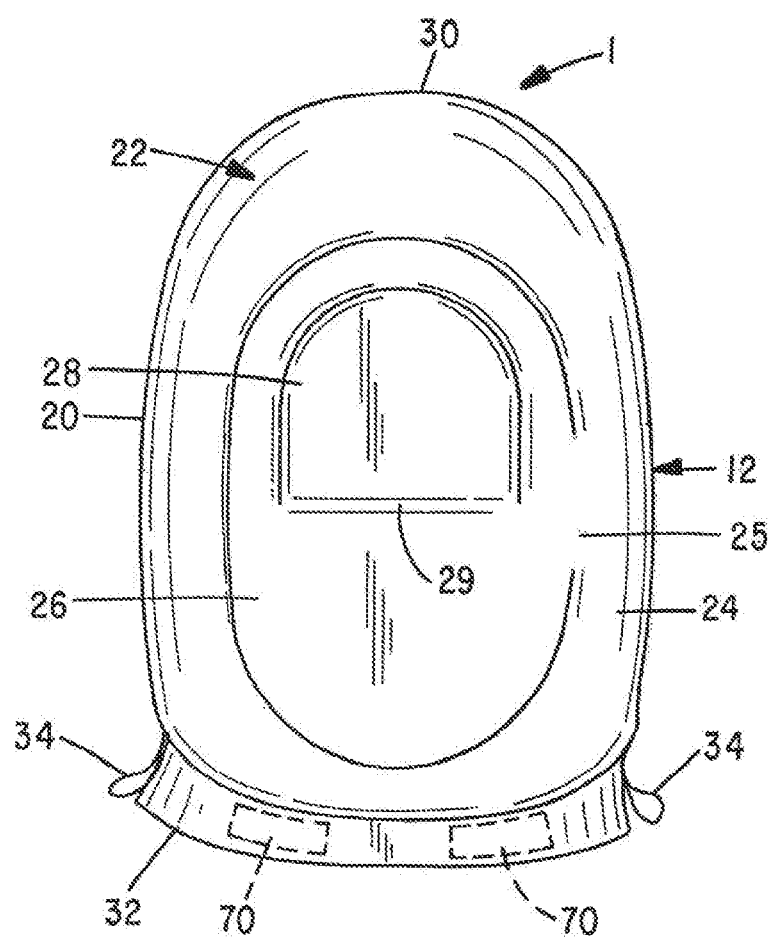
FIG. 5 is a left-side view of the blind of FIG. 1.
Figure 12:
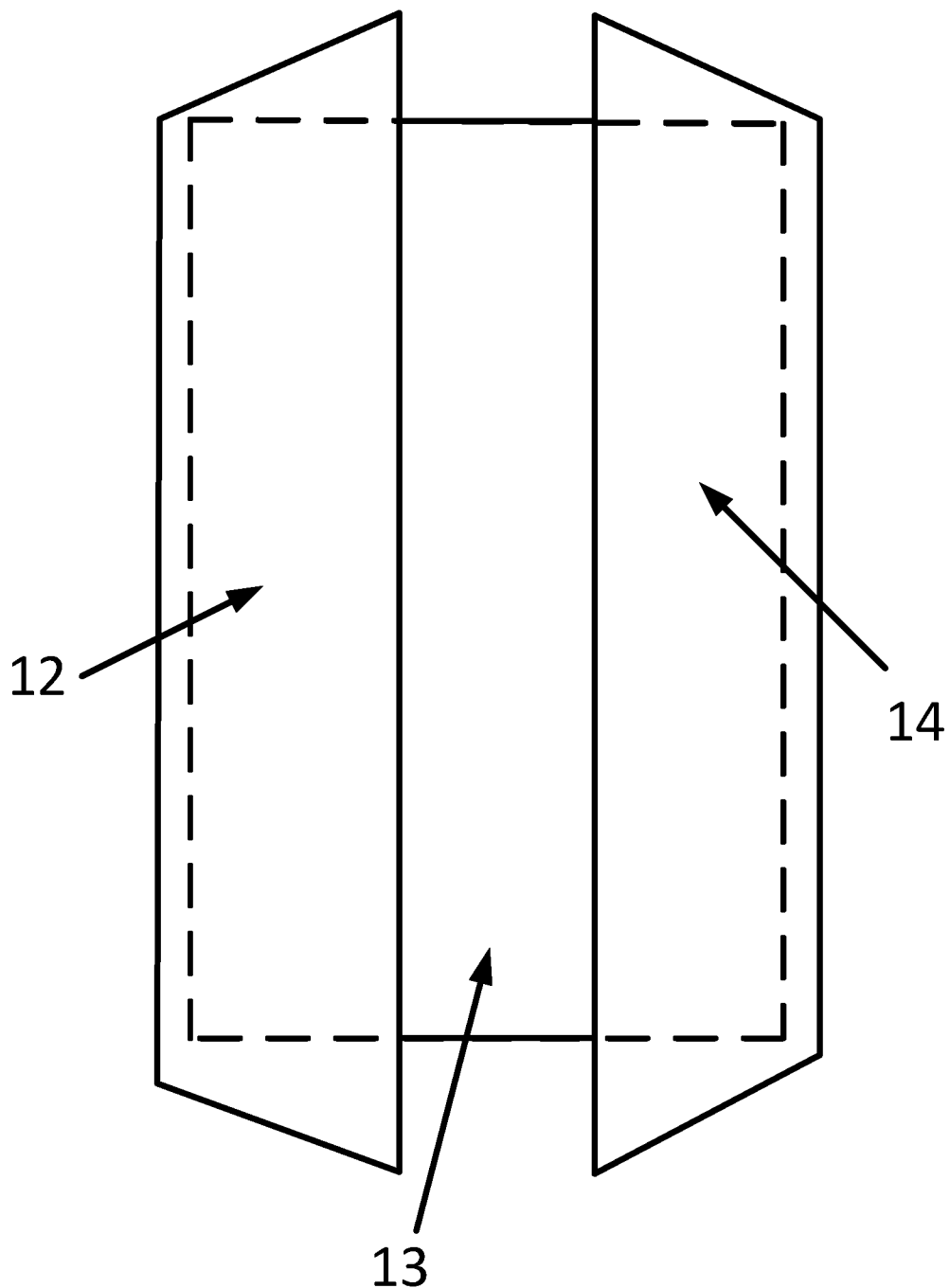
FIG. 12 is a perspective view of an alternative embodiment of the invention wherein the three frame sidewalls each have a rectangular-shaped frame.
Figure 13:
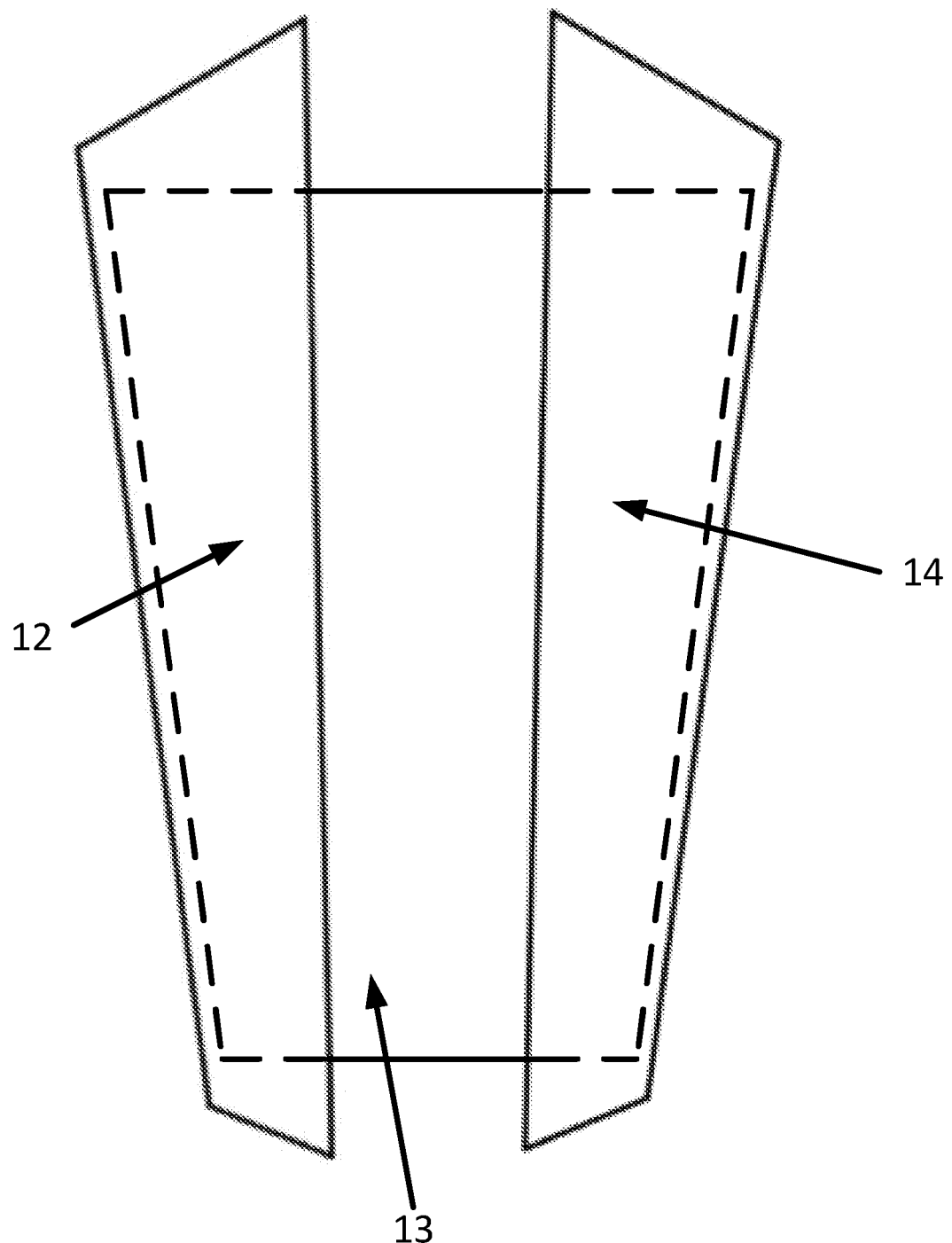
FIG. 13 is a perspective view of another alternative embodiment of the invention wherein the three frame sidewalls each have a trapezoidal-shaped frame.

The foregoing description should permit one of ordinary skill in the art to appreciate the features and attributes of the present invention. Of course, various changes may be made without deviating therefrom. For example, the blind can be constructed with framed side walls 12, 13 and 14 each constructed with a rectangular frame as shown in FIG. 12. Further, the blind can be constructed with a narrower base that rests on the platform of the tree stand and a wider top so that one or more of the framed sidewalls lean upwardly and outwardly as they extend from the base to the top of the wall. This provides the user with more shoulder room and more space to manipulate hunting or photography equipment. This can be done by making the flexible fabric hinge material between framed sidewall 13 and two adjacent sidewalls 12 and 14 narrower at the bottom and wider at the top. Alternatively, the framed sidewalls 12, 13 and 14 may each have a trapezoidal frame, as shown in FIG. 13. While not shown in FIGS. 12 and 13, the framed sidewalls of FIGS. 12, 13 and 14, in practice, will be provided with the multi-part fabric structure 22 comprising an outer section 24, an inner section 26, and a flap 28 as shown in FIGS. 2-5 and with closure members selected, for example, from the types shown in FIGS. 7-11. Further, a panel like flexible frameless panel 50 will extend between the framed sidewalls 12 and 14 opposite framed sidewall 13. Likewise, the bottom of the fabric panels with strips of hooks 70 of hook and loop type fasteners, as shown in FIG. 5.

Additionally, the frames of the framed sidewalls 12, 13 and 14 need not extend around the perimeter of the framed sidewalls. FIGS. 14 through 17 show an alternative frame arrangement that may be used for each of the frames of the framed sidewalls 12, 13 and 14.

Figure 14:
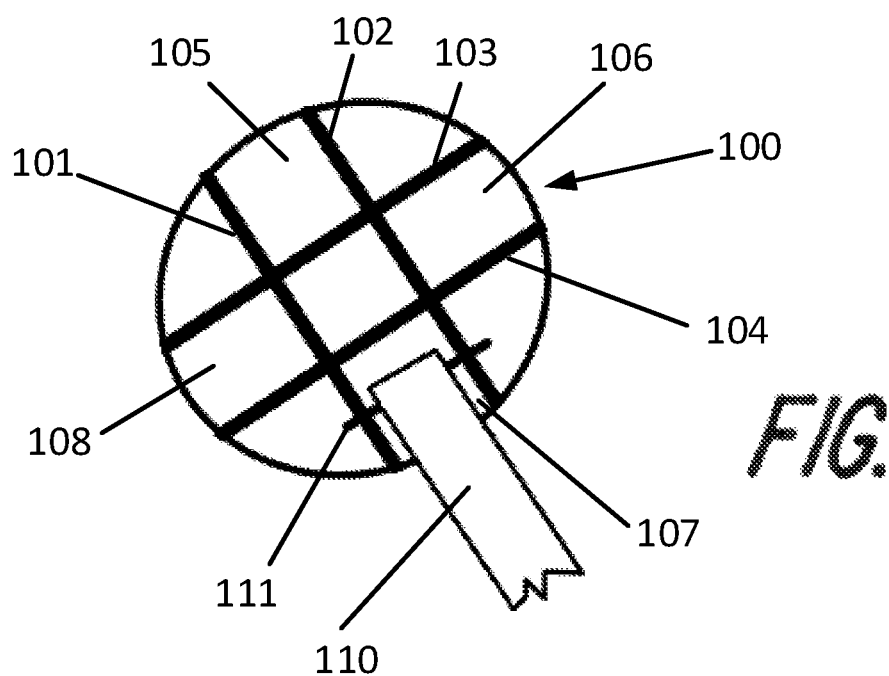
FIG. 14 shows the hub of an alternative frame arrangement.

In the alternative embodiment of FIGS. 14-17, the frame of each framed sidewall comprises a central hub 100 comprising a circular base. Four hub walls 101, 102, 103, and 104 project in the same direction from the base to form four pole receiving channels 105, 106, 107, and 108. Each channel receives a first end of one of four poles 110, 112, 114 and 116. These poles are each pivotally attached to the hub by an axle pin or rivet 111 extending through the post immediately adjacent the first end of the post and the two walls refining the sides of the channel in which the first end of the post is received. For example, FIG. 14 shows the first end of post 110 within the channel 107. Walls 101 and 102 define the sides of channel 107. Pin 111 extends through wall 101, the first end of pole 110, and wall 102. The pins or rivets 111 act as axles defining longitudinal axes about with the attached poles pivot. This frame has a collapsed position (not shown) in which the poles 110, 112, 114, 116 extend generally parallel to each other in a direction generally normal to the plane defined by the base of the hub 100. This frame also has a fully extended position, shown in FIGS. 14 through 17, in which the poles 110, 12, 114, and 116 extend generally radially from the hub 100.

When a frame such as those depicted in FIGS. 14 through 17 is used in the construction of a framed sidewall 12, 13 or 14, some means is employed to couple the second ends of each post of the frame to a corner of the fabric structure 22 of the framed sidewall. Such means may comprise hook and loop fasteners, buttons, snaps, magnets, second pins or rivets, but more typically this means will comprise pockets (not shown) formed at each corner of the fabric structure 22 and adapted to receive the second ends of the four poles. The poles may then be rotated relative to the hub to the expanded position shown in FIGS. 15 through 17. The size and fit of the fabric structure 22, and particularly outer section 24 of the fabric structure 22, is such that sufficient tension is supplied by the fabric interacting with the frame to prevent the frame from inadvertently collapsing when the poles have been rotated over center to achieve an over-centered position relative to the pins coupling the poles to the hub. More specifically, this tension prevents the poles from moving back over center and collapsing unless a sufficient intentional force is applied to the hub or poles to intentionally collapse the frame. Additional locking means, not shown, may be employed to lock the poles in the over-centered position, but employment of such means is not typically required.

To permit adjustment of the size of the blind and the tension between the fabric panel 22 and the frame shown in FIGS. 14 through 17, the fabric panel may be provided with tensioning slits such as the tensioning slits 121 and 122 of framed sidewall 13, tensioning slit 123 of framed sidewall 12, and tensioning slit 124 of framed sidewall 14. These can be left open, partially closed or fully closed through the use of any of the closure mechanisms shown in FIGS. 7 through 11. A zipper or hook and loop type closure may be preferred for greater control of the tension.

Erection of a blind having framed sidewalls incorporating frames of the type shown in of FIGS. 14-17 will now be described. First, the frame of each framed sidewall 12, 13 and 14 is coupled to the associated fabric structure 22 of the sidewall with the frame collapsed, e.g., the second ends of each of the poles 110, 112, 114, and 116 of the frames are inserted into pockets located at the four corners of the fabric structure 22 of the three framed sidewalls. Next, the user begins to rotate the poles of the frames of the framed sidewalls from the collapsed position to an expanded position. When there is sufficient tension between the poles and fabric structure 22, the rotation process may be completed by pushing on the hub 100 until the poles are in the fully extended over-center position, shown in FIG. 15. When the frames of the three framed sidewalls are in their fully extended position, the blind can be positioned on the platform of a tree stand. The fasteners associated with tensioning slits 121, 122, 124 and 124 may be manipulated to adjust the tension between the frame and the fabric structure 22 of each of the framed sidewalls to accommodate different configurations of the blind, e.g., triangular, trapezoidal or rectangular when viewed from the top, that may be employed based on the size and shape of the platform of the tree stand. The blind can then be fastened to the tree stand in any of the various ways described above with respect to the other embodiments. While not shown in FIGS. 16 and 17, the framed sidewalls 12, 13 and 14 have the same fabric structure 22 with the same outer section 24, inner section 26, and flap 28, and closure means for closing (or partially closing) the flap relative to the inner section and the inner section relative to the outer section. The blind also includes a roof 30 and a flexible frameless panel 50, with vertical and horizontal slits 51 and 52, extending between framed sidewalls 12 and 14.

Figure 15:
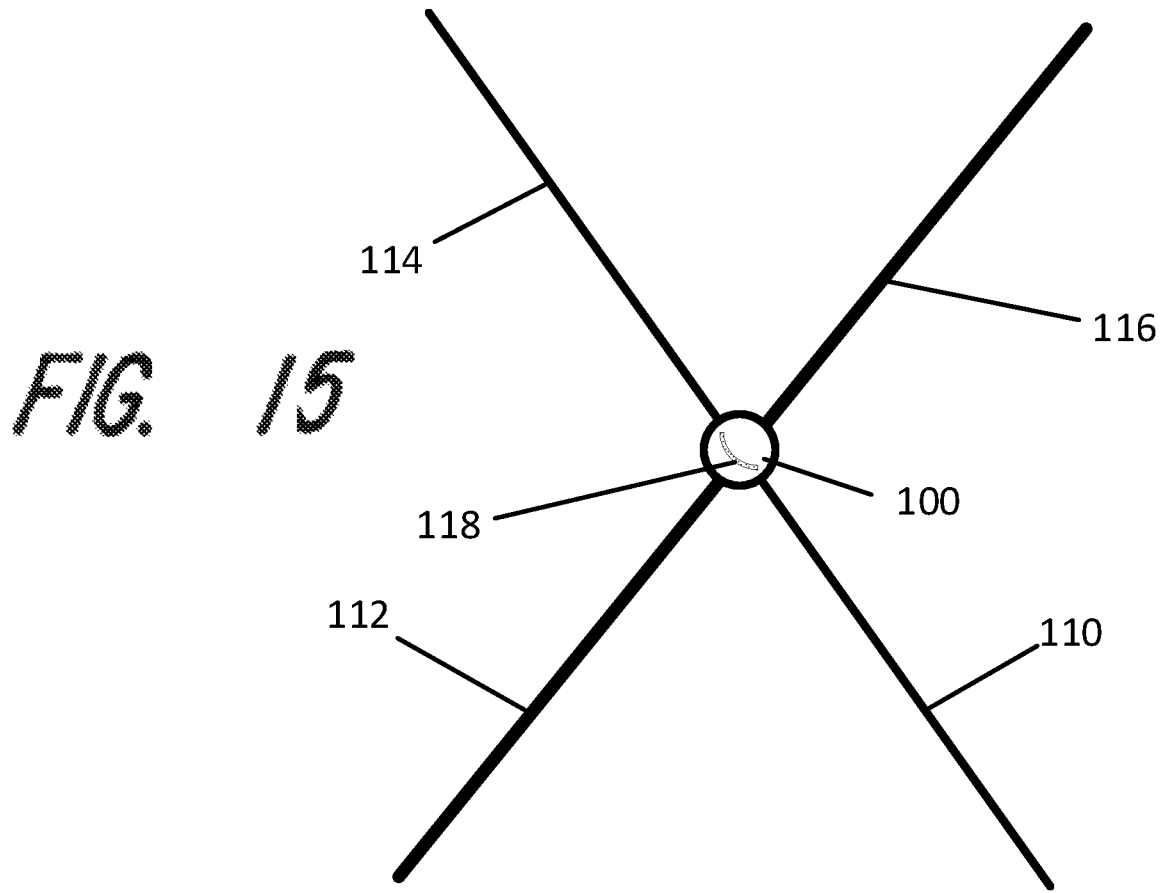
FIG. 15 is a plan view of a frame incorporating the hub of FIG. 14.
Figure 16:
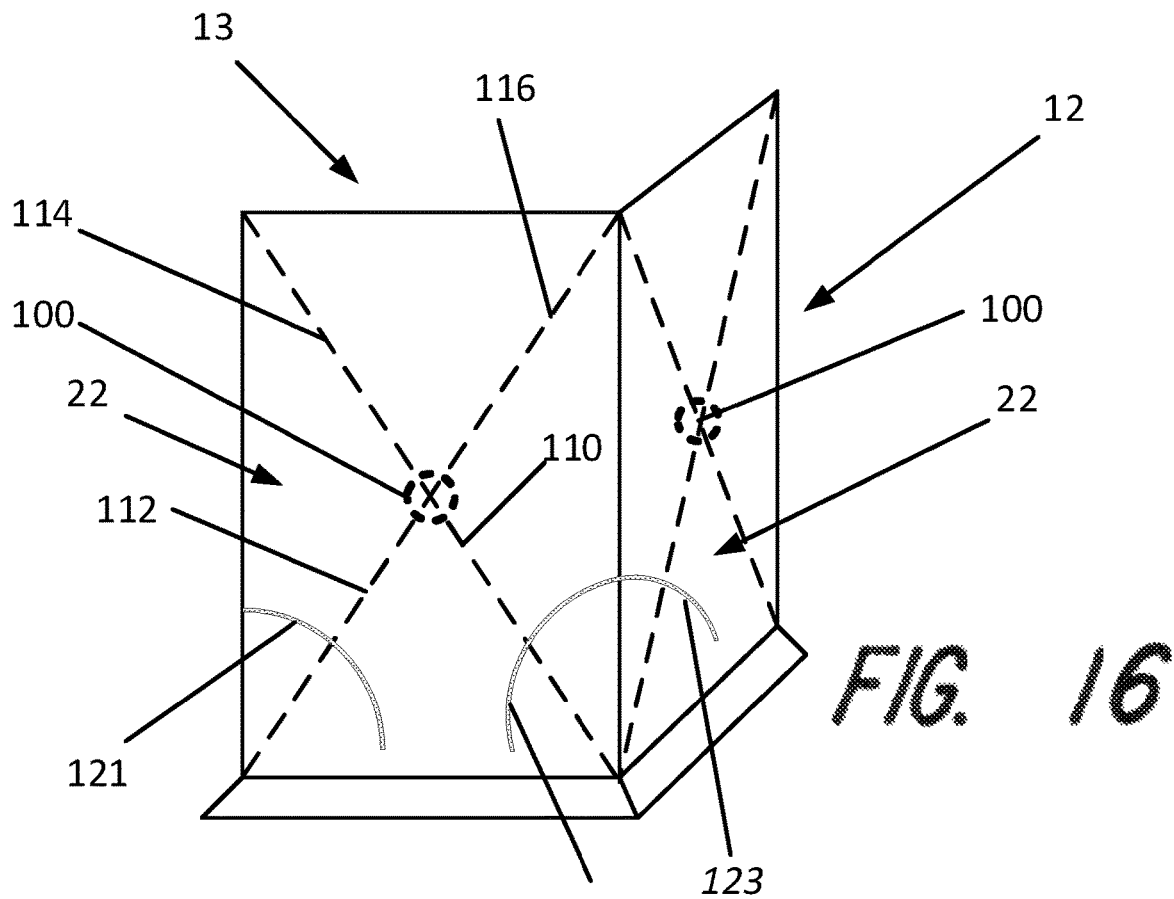
FIG. 16 shows two frame sidewalls, each including the frame of FIG. 15.
Figure 17:
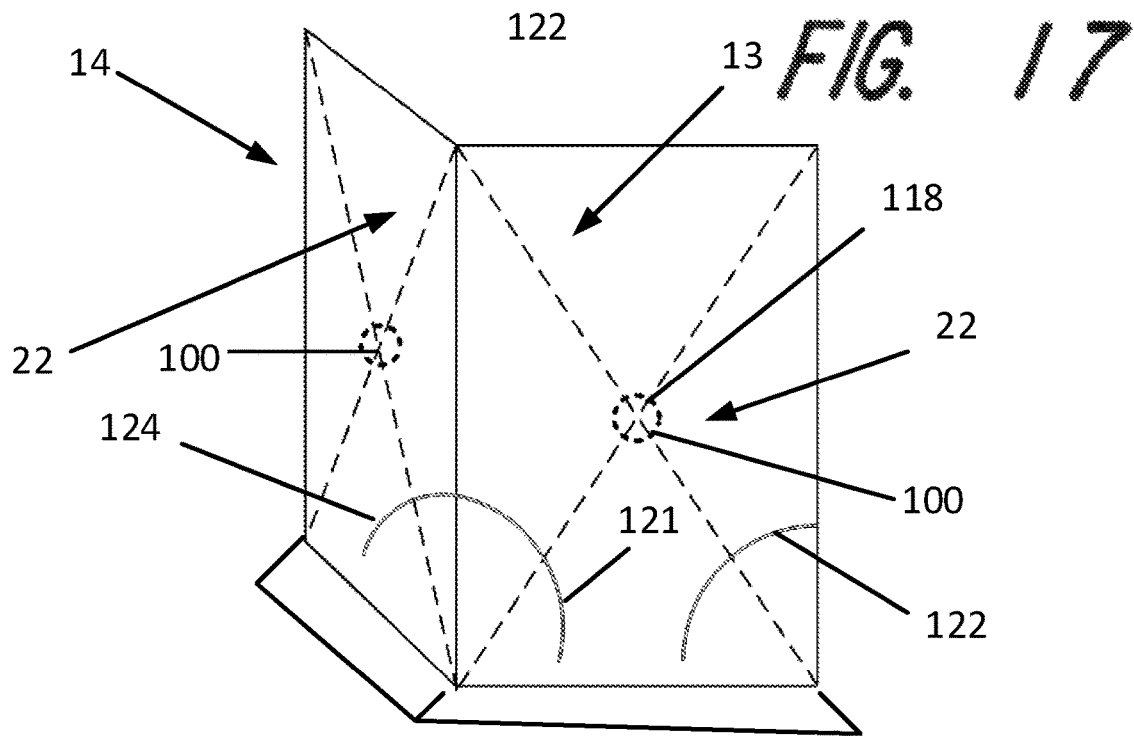
FIG. 17 shows one of the framed sidewalls of FIG. 16 coupled to an additional framed sidewall.

When one desires to collapse a frame of framed side panels incorporating the frame of FIG. 15, one can either push on the hub (or pull on the optional strap 118 attached to the hub) with sufficient force and in a direction that rotates the poles from the over-center position allowing them to return to the collapsed position.

The roof 30 may be frameless, such that it is supported solely by the frames of the framed sidewalls. However, in some embodiments the roof may have its own frame. Including such a roof frame is particularly useful when the blind is used in wet or snowy conditions to keep the roof from sagging. The roof frame may be of the type shown in FIGS. 14 and 15. A frame of this type may be easily installed or removed at the option of the user based on existing weather conditions. For example, if the roof is provided with pockets adapted to receive ends of the poles of the frame, such as at each of the roof's four corners, the hub can be located at the center of the roof and the free ends of the poles may be inserted into the pockets. The hub can then be pushed upwardly to place the poles in an over-center locked position. The hub, axle pins/rivets and poles can be arranged so that the over-centered position of the poles will serve to elevate the center of the roof sufficiently to allow water to flow off the roof and over the framed sidewalls and panel of the blind. When it is desirable to collapse the blind, one can pull with sufficient force to move the poles back over center allowing the frame to be collapsed and removed from the roof. Other roof frames may be used without deviating from the invention.

The above description is, of course, intended to be exemplary rather than limiting. Various additional modifications may be made without deviating from the invention.

What is claimed:

1. A blind adapted for selectable use on the ground and on the platform of a tree stand, comprising:
   a. first, second and third framed sidewalls, each of said first, second and third framed sidewalls comprises a collapsible frame and a multi-part fabric structure, said multi-part fabric structure comprising an outer section and an inner section, said outer section secured to the collapsible frame and comprising a large central opening, said inner section adapted to selectively open and close selected portions of the large central opening of the outer section;
   b. a fabric roof;
   c. a fabric skirt, wherein the skirt is adapted to assist in holding the blind in place;
   d. a fabric panel wherein said fabric panel is attached to and extends between the first framed sidewall and the second framed sidewall, said fabric panel adapted to permit the first framed sidewall and the second framed sidewall to be move relative to each other to adjust the shape and size of blind, said shape being selectable; and
   e. a base and a portion above the base that is wider than the base.

2. The blind of claim 1 wherein the panel has a vertical slit.

3. The blind of claim 2 further including first closure members adapted to selectively close the vertical slit.

4. The blind of claim 3 wherein said first closure members are selected from a group consisting of zippers, hook and loop fasteners, snaps, buttons, and magnetic fasteners.

5. The blind of claim 1 further comprising second closure members for holding selected portions of each of the inner sections in a closed position relative to the opening of the corresponding outer section.

6. The blind of claim 5 wherein said second closure members are selected from a group consisting of zippers, hook and loop fasteners, snaps, buttons, and magnetic fasteners.

7. The blind of claim 1 wherein said skirt comprises at least one securing member.

8. The blind of claim 7 wherein said securing member is selected from a group consisting of loops, holes through the skirt surrounded by grommets, and a hook and loop fastener.

9. The blind of claim 1 further comprising a member adapted to temporarily extend between the first framed sidewall and the second framed sidewall to retain the blind in a trapezoidal shape.

10. The blind of claim 1 wherein the multi-part fabric structure of each of the first, second and third framed sidewalls further comprises a flap adapted to move between an open and a closed position.

11. The blind of claim 10 further including at least one third closure member to selectively hold at least one of said flaps of the first, second and third framed sidewalls in the closed position.

12. The blind of claim 11 wherein said at least one third closure member is selected from a group consisting of zippers, hook and loop fasteners, snaps, buttons, and magnetic fasteners.

13. The blind of claim 1 wherein the collapsible frame of each framed sidewall is made of frame sections having ends selectively joined together by connectors.

14. The blind of claim 1 wherein the fabric used to form the multi-part fabric panels structure of each of the first, second and third framed sidewalls, the roof, and the skirt is water repellant.

15. The blind of claim 1 wherein the selectable shapes comprise a substantially triangular shape and a substantially trapezoidal shape.

16. The blind of claim 1 wherein the fabric used to form the multi-part fabric structures, the roof and the skirt is of a color selected to camouflage the blind.

17. The blind of claim 1 wherein the fabric used to form the multi-part fabric structure of each of the first, second and third framed sidewalls, the roof and the skirt incorporates a pattern selected to camouflage the blind.

18. The blind of claim 1 wherein the collapsible frame of at least one of the first, second and third framed sidewalls comprises a hub and a plurality of poles each pivotally coupled to the hub.

19. A blind of adapted for selectable use on the ground and on the platform of a tree stand, comprising:
   a. first, second and third framed sidewalls, each of said first, second and third framed sidewalls comprises a collapsible frame and a multi-part fabric structure, said multi-part fabric structure comprising an outer section and an inner section, said outer section secured to the collapsible frame and comprising a large central opening, said inner section adapted to selectively open and close selected portions of the large central opening of the outer section;
b. a fabric roof;
c. a fabric skirt, wherein the skirt is adapted to assist in holding the blind in place;
d. a fabric panel wherein said fabric panel is attached to and extends between the first framed sidewall and the second framed sidewall, said fabric panel adapted to permit the first framed sidewall and the second framed sidewall to be move relative to each other to adjust the shape and size of blind, said shape being selectable; and
wherein the collapsible frame of each framed sidewall is oval shaped.

20. The blind of claim 19 wherein the blind has a base and a portion above the base that is wider than the base.

\* \* \* \* \*